United States Patent [19]

Odate et al.

[11] Patent Number: 4,847,323

[45] Date of Patent: Jul. 11, 1989

[54] RESIN COMPOSITION HAVING NACREOUS GLOSS

[75] Inventors: Ryoji Odate; Tomoyuki Haga, both of Yokohama, Japan

[73] Assignee: Shiseido Company Ltd., Tokyo, Japan

[21] Appl. No.: 140,702

[22] Filed: Jan. 4, 1988

Related U.S. Application Data

[63] Continuation-in-part of Ser. No. 66,872, Jun. 25, 1987, abandoned.

[30] Foreign Application Priority Data

Jun. 27, 1986 [JP] Japan .................................. 61-149388

[51] Int. Cl.$^4$ ...................... C08L 21/06; C08L 25/04; C08L 51/04
[52] U.S. Cl. ........................................ 525/71; 525/84; 525/86; 525/239; 525/70; 525/931
[58] Field of Search ...................... 525/71, 84, 86, 239

[56] References Cited

U.S. PATENT DOCUMENTS

| | | | |
|---|---|---|---|
| Re. 28,594 | 10/1975 | Ronzoni et al. | 525/227 |
| 2,353,457 | 7/1944 | Gaessling | 525/227 |
| 3,234,313 | 2/1966 | Miller et al. | 525/239 |
| 3,246,061 | 4/1966 | Blatz | 264/95 |
| 3,342,920 | 9/1967 | Fukushima et al. | 525/239 |
| 3,657,390 | 4/1972 | Tanaka et al. | 525/71 |
| 4,275,178 | 6/1981 | Yusa et al. | 525/71 |
| 4,276,391 | 6/1981 | Hardt et al. | 525/71 |
| 4,302,555 | 11/1981 | Falk | 525/239 |
| 4,513,108 | 4/1985 | Jones | 525/71 |

FOREIGN PATENT DOCUMENTS 56-050946  5/1981  Japan .................................. 525/86

OTHER PUBLICATIONS

Kaufman et al.–Intro. Polym. Sci & Tech–An SPE Textbook pp. 575–576–10/86.

*Primary Examiner*—Carman J. Seccuro
*Attorney, Agent, or Firm*—Sprung Horn Kramer & Woods

[57] ABSTRACT

A resin composition having a nacreous gloss comprising (i) a polyvinyl chloride resin and (ii) a polystyrene resin or a high impact polystyrene resin is provided. This composition can be advantageously molded into any article and provide an excellent nacreous gloss thereto.

6 Claims, No Drawings

RESIN COMPOSITION HAVING NACREOUS GLOSS

CROSS-REFERENCE TO RELATED APPLICATION

This application is a continuation-in-part of Ser. No.066,872, filed June 25, 1987, now abandoned.

BACKGROUND OF THE INVENTION

1. Field of the Invention

The present invention relates to a resin composition having a nacreous gloss and capable of being molded by, for example, blow molding, vacuum molding, or biaxial oriented blow molding. The present resin composition is especially convenient for application in the fields of, for example, wrapping containers such as cosmetic containers and detergent containers, framing materials such as protective frames for cosmetic containers and soap containers, vacuum molded articles such as blister wrapping and PTP (i.e., Press Through Pack) wrapping, and decorative molded articles such as housing and building materials.

2. Description of the Related Art

In the conventional method, a nacreous gloss is given to molded articles such as the above-mentioned wrapping containers, framing materials, vacuum molded articles, and housing or building materials by using nacreous gloss providing agents such as fish scale guanine, talc flake powder, and various lead salt, mica, or titanium pearling agents in the form of flaky crystals. These agents are generally coated, as a coating composition, on the surface of the intended articles or are blended into the intended articles. However, since nacreous gloss providing agents in the form of powder are present on or near the surface, a desired transparent or clear nacreous gloss is not obtained by this method. As other methods of providing a nacreous gloss, JP-B-43-13384 (Kokoku), JP-B-46-31467 (Kokoku), and JP-A-51-41749 (Kokai) propose various resin compositions having a nacreous gloss. According to these proposals, polycarbonate resins, methyl methacrylate resins, styrene-acrylonitrile resins, or polyacryl resins and polyolefin or polystyrene resins are used in the resin compositions. But a resin composition having a nacreous gloss containing vinyl chloride resins as a main constituent was not known in the art. Furthermore, the applications of the above-proposed conventional resin compositions giving a nacreous gloss to molded articles are limited, due to the properties of the resins. For example, nacreous resin compositions containing polycarbonate resins and methyl methacrylate resins can be used only in injection molding, and thus sheet molded articles having a thin wall thickness and molded bottles having a thin wall thickness, etc., cannot be produced from these resin compositions, although they can be used as thick covering materials or container materials.

SUMMARY OF THE INVENTION

Accordingly, the objects of the present invention are to eliminate the above-mentioned disadvantages in the conventional nacreous resin compositions and to provide a nacreous resin composition containing as a main constituent a vinyl chloride resin, which can be molded to a desired article by any molding technique to obtain, for example, thick covering materials and container materials by injection molding and sheet molded articles and bottles having a thin wall thickness by blow molding, vacuum molding, or biaxially oriented blow molding.

Other objects and advantages of the present invention will be apparent from the following description.

In accordance with the present invention, there is provided a resin composition having a nacreous gloss comprising (i) a polyvinyl chloride resin and (ii) a polystyrene resin or an impact resistant polystyrene resin. This nacreous resin composition can be advantageously used in blow molding, vacuum molding, or biaxially oriented blow molding.

DESCRIPTION OF THE PREFERRED EMBODIMENTS

The polyvinyl chloride resins usable as component (i) in the present invention are polyvinyl chloride homopolymer and polyvinyl chloride compolymers (e.g., copolymers of e.g., 80% or more of vinyl chloride with a minor amount of vinyl acetate, vinylidene chloride, (meth)acrylic acid or the esters thereof, maleates, or acrylonitrile) conventionally used in the resin compositions. Typical examples of such polyvinyl chloride resins are those having an average degree of polymerization of 400 to 3000. Especially, polyvinyl resins having an average degree of polymerization of 400 to 1300, preferably 600 to 1300 are suitable for use as a blow molding or biaxially oriented blow molding resin and those having an average degree of polymerization of 700 to 3000, preferably 700 to 1300 are suitable for use as a vacuum molding resin.

The polystyrene resins usable as component (ii) in the present inventions are those conventionally used in the art including, for example, general grade, good flowability grade, heat resistant grade, and high gloss grade polystyrene resins, preferably having a weight average molecular weight of 140,000 to 300,000, more preferably 150,000 to 280,000. Furthermore, the impact resistant polystyrene resins, which have been developed to improve the impact resistance of polystyrene, also can be used as the component (ii) in the present nacreous resin composition. These impact resistant polystyrene resins include copolymers and mixtures of polystyrene and synthetic rubbers such as polybutadiene, and are called high impact polystyrenes or transparent high impact polystyrenes depending upon the degree of copolymerization or mixing. Typical examples of the commercially available high impact polystyrenes are Denka HI-G-1-301 (Trademark, available from Denki Kagaku Kogyo K.K., Japan) and HI styron 470 available from Asahi Chemical Industry K.K., Japan. Typical examples of the commercially available transparent impact resistant polystyrenes are Clearen 750L and 730L (Trademark, both available from Denki Kagaku Kogyo K.K., Japan). The preferable molecular weight of the impact resistant polystyrene resins is 150,000 to 200,000.

Although there are no critical limitations to the compounding ratio of the polyvinyl chloride resin and the polystyrene or impact resistant polystyrene resins in the present nacreous resin composition, the preferable amount of the polystyrene or impact resistant polystyrene resins is 4 to 30 parts by weight, especially 5 to 25 parts by weight, based on 100 parts by weight of the polyvinyl chloride resin. When the amount of the polystyrene or impact resistant polystyrene resin is less than 4 parts by weight, the desired nacreous gloss is not obtained. Conversely, when the amount of the polystyrene or impact resistant polystyrene resin is more than 30 parts by weight, the blow moldability thereof is decreased.

Furthermore, according to the present invention, the impact resistance can be advantageously increased by formulating a resin modifier into the polyvinyl chloride resin. Examples of such resin modifiers are transparent ABS resins (i.e., thermoplastic resins composed of acrylonitrile, butadiene, and styrene) such as JSR ABS-55NP (Trademark, commercially available from Japan Synthetic Rubber Co., Ltd., Japan) and MBS resins (i.e., graft terpolymers of butadiene, styrene, and methyl methacrylate) such as Metablen 202 (Trademark, commercially available from Mistubishi Rayon Co., Ltd., Japan). The ABS resins are described in, for example, "ABS Resins", published by Kobunshi Gakkai and sold by Maruzen K.K., Japan, and the MBS resins are described in, for example, "Functional Acrylic Resins" by Eizo Oomori, published by K.K. Techno System, Japan. These resin modifiers are preferably formulated into the polyvinyl resin in an amount of 25 parts by weight or less, based on 100 parts by weight of the polyvinyl chloride resin. More specifically, the resin modifiers are preferably formulated in an amount of less than 5 parts by weight based on 100 parts by weight of the polyvinyl chloride resin when used in vacuum molding, and in an amount of 5 to 25 parts by weight based on 100 parts by weight of the polyvinyl chloride when used in blow molding or biaxially oriented blow molding.

Furthermore, the nacreous resin compositions according to the present invention may contain any conventional ingredients in addition to the above-mentioned components. Examples of such conventional ingredients are stabilizers for polyvinyl chloride such as organobutyl tin maleate, organobutyl tin laurate, calcium soap, barium salt, mercaptide type organic tin compounds; lubricants such as stearyl alcohol, stearic acid, fatty acid amides, hydrocarbons, and natural waxes; coloring agents; and the like. Thus, molded articles having an excellent nacreous gloss and an excellent appearance and stability can be obtained according to the present invention.

As mentioned above and as illustrated in the following Examples and Comparative Examples, the nacreous resin compositions according to the present invention can be molded into any desired molded article having an excellent and deep transparent or clear nacreous gloss. This unexpected nacreous gloss is believed to be obtained from the irregular reflection. For example, the present nacreous resin compositions can be molded into thick covering materials and container materials by injection molding, and further, into sheet molded articles and bottles having a thin wall thickness by blow molding and vacuum molding. These molded articles having a thin wall thickness cannot be molded from the conventional nacreous resin compositions described above. Furthermore, the bottles or other articles obtained from biaxially oriented blow molding have an improved strength and gloss.

EXAMPLES

The present invention now will be further illustrated by, but is by no means limited to, the following Examples, in which the composition amounts used are based on "parts by weight".

EXAMPLES 1 to 9

The nacreous resin compositions listed in Table 1 were prepared by thoroughly mixing the ingredients listed in Table 1. The molded articles obtained from the resultant nacreous resin compositions were organoleptically evaluated under the following criteria:

A. Nacreous gloss o: Excellent nacreous gloss
Δ: Poor nacreous gloss
x: Substantially no nacreous gloss B. Moldability The sample composition was vacuum molded after heating the sample sheet having a thickness of 0.5 mm at a temperature of 100° C. to 125° C. for 5 to 8 seconds when the amount of ABS or MBS resin was 5 parts or less based on 100 parts of the polyvinyl chloride resin, and blow molded to 240 ml bottles having a size of 64 mm × 35 mm × 185 mmH at a resin temperature of 200° to 207° C., when the amount of ABS or MBS resin was more than 5 parts based on 100 parts of the polyvinyl chloride resin. The molded articles were evaluated under the following criteria.

o: Good moldability
Δ: Fair moldability
x: Poor moldability

The evaluation results are shown in Table 1.

TABLE 1

| Example No. | 1 | 2 | 3 | 4 | 5 | 6 | 7 | 8 | 9 |
|---|---|---|---|---|---|---|---|---|---|
| Composition (parts) | | | | | | | | | |
| Vinyl chloride*1 | 100 | 100 | 100 | 100 | 100 | 100 | 100 | 100 | 100 |
| ($\overline{P}$*2) | (800) | (800) | (800) | (700) | (700) | (700) | (700) | (800) | (700) |
| Polystyrene*3 | 15 | 10 | 25 | 20 | 5 | — | — | — | — |
| Impact resistant polystyrene*4 | — | — | — | — | — | 5 | 25 | 10 | 15 |
| Resin modifier | | | | | | | | | |
| ABS*5 | — | — | — | — | — | — | — | 15 | 5 |
| MBS*6 | — | — | 5 | 10 | 15 | 25 | 15 | — | 20 |
| Stabilizer | | | | | | | | | |
| Organic tin maleate | 2 | 2 | 2 | 2 | 2 | 2 | 2 | 2 | 2 |
| Organic tin laurate | 1 | 1 | 1 | 1 | 1 | 1 | 1 | 1 | 1 |
| Lubricant | | | | | | | | | |
| Stearyl alcohol | 1 | 1 | 1 | 1 | 1 | 1 | 1 | 1 | 0.5 |
| Stearic acid | — | 0.5 | 0.5 | 0.5 | 0.5 | 0.5 | 0.5 | 0.5 | 0.5 |
| Evaluation result | | | | | | | | | |
| Nacreous gloss | o | o | o | o | o | Δ | o | o | o |

TABLE 1-continued

| Example No. | 1 | 2 | 3 | 4 | 5 | 6 | 7 | 8 | 9 |
|---|---|---|---|---|---|---|---|---|---|
| Moldability | o | o | o | o | o | Δ | o | o | o |

Note: The compositions shown in Table are in terms of "parts" based on 100 parts of vinyl chloride (i.e., "PHK").
*[1]BINIKURON 4000 LL ($\bar{p}$ = 700) and 3000 L ($\bar{p}$ = 800) available from Mitsui Toatsu Chemicals, Inc.
*[2]Average degree of polymerization
*[3]Denka Styrol GP-1 having a weight average molecular weight of 200,000 available from Denki Kagaku Kogyo K.K.
*[4]Denka Styrol HI-G-1-301 having a weight average molecular weight of 160,000 available form Denki Kagaku Kogyo K.K.
*[5]JSR ABS-55NP available from Japan Synthetic Rubber Co., Ltd.
*[6]Metablen C 202 available from Mitsubishi Rayon Co., Ltd.

COMPARATIVE EXAMPLE 1

The polyvinyl chloride resin having an average degree of polymerization of 700 used in Example 1 was molded, without formulating a polystyrene or an impact resistant polystyrene therein, into bottles by blow molding. However, the resultant bottles did not have a nacreous gloss.

COMPARATIVE EXAMPLE 2

An attempt was made to blow mold the polyvinyl chloride having an average degree of polymerization of 700, after formulating therein 30 parts, based on 100 parts of the polyvinyl chloride resin, of the polystyrene used in Example 1 or the high impact polystyrene used in Example 8. However, the resin composition was too soft, and thus blow molding thereof was impossible.

EXAMPLE 10 to 17

The nacreous resin compositions listed in Table 2 were prepared by thoroughly mixing the ingredients listed in Table 2. The compositions were blow molded in Examples 10 to 13 and vacuum molded, in Examples 14 to 17, both in the same manner as in Examples 1 to 9. The molded articles obtained from the resultant nacreous resin compositions were organoleptically evaluated under the same criteria as used in Examples 1 to 9. The evaluation results are shown in Table 2.

TABLE 2

| Example No. | 10 | 11 | 12 | 13 | 14 | 15 | 16 | 17 |
|---|---|---|---|---|---|---|---|---|
| Composition (parts) | | | | | | | | |
| Vinyl chloride*[1] | 100 | 100 | 100 | 100 | 100 | 100 | 100 | 100 |
| ($\bar{P}$*[1]) | (400) | (520) | (1100) | (1300) | (1300) | (1300) | (2000) | (2800) |
| Polystyrene*[1] | 20 | 20 | — | — | — | 20 | — | 20 |
| Impact resistant polystyrene*[1] | — | — | 20 | 20 | 20 | — | 20 | — |
| Resin modifier | | | | | | | | |
| MBS*[1] | 15 | 15 | 15 | 15 | 15 | — | 5 | 5 |
| Stabilizer | | | | | | | | |
| Organic tin maleate | 2 | 2 | 2 | 2 | 2 | 2 | 2 | 2 |
| Organic tin laurate | 1 | 1 | 1 | 1 | 1 | 1 | 1 | 1 |
| Lubricant | | | | | | | | |
| Stearyl alcohol | 1 | 1 | 1 | 1 | 1 | 1 | 1 | 1 |
| Stearic acid | 0.5 | 0.5 | 0.5 | 0.5 | 0.5 | 0.5 | 0.5 | 0.5 |
| Evaluation result | | | | | | | | |
| Nacreous gloss | o | o | o | o | o | o | o | o |
| Moldability | Δ | Δ | o | Δ | o | o | Δ | Δ |

*[1]: See footnote of Table 1

We claim:

1. A molded article having a nacreous gloss derived from a resin composition having a nacreous gloss comprising (i) a polyvinyl chloride resin and (ii) 4 to less than 30 parts based an 100 parts of the polyvinylchloride resin of a polystyrene resin or an impact resistant polystyrene resin, said molded article being produced by biaxial blow molding.

2. A molded article as claimed in claim 1, wherein said polyvinyl chloride contains a resin modifier formulated therein.

3. A molded article as claimed in claim 1, wherein the average degree of polymerization of the polyvinyl chloride resin is 400 to 3000.

4. A molded article as claimed in claim 1, wherein the weight average molecular weight of the polystyrene resin is 140,000 to 300,000.

5. A molded article as claimed in claim 1, wherein the weight average molecular weight of the impact resistant polystyrene resin is 150,000 to 200,000.

6. A molded article as claimed in claim 2, wherein the resin modifier is an ABS resin or MSB resin.

* * * * *